May 30, 1961     B. C. HOLBEN     2,986,264

ARTICLE DISTRIBUTION SYSTEM

Filed Feb. 26, 1959

INVENTOR
Bernard C. Holben
By Anthony D. Gennaro

United States Patent Office 2,986,264
Patented May 30, 1961

2,986,264
ARTICLE DISTRIBUTION SYSTEM

Bernard C. Holben, Dublin, Ohio, assignor to Industrial Nucleonics Corporation, a corporation of Ohio Filed Feb. 26, 1959, Ser. No. 795,782
3 Claims. (Cl. 198—38)

This invention relates to branched conveyor systems and routing means for articles carried thereby, and more particularly to an improved method and means for expediting the distribution of articles to a plurality of destinations.

There are numberless industrial applications wherein conveyor networks are most essential for the success of a given operation. Mechanized conveyor systems are quite often utilized to cary articles of various sorts from one point to another. In this manner, much manual labor is eliminated, and a substantial reduction in damage due to mishandling is thereby realized.

Recently, a technique has been developed for automatically diverting certain articles from a main conveyor to a specified side conveyor. By specially encoding each article, electronically sensing the code thereof and operating article diverting gates at preselected points along the main conveyor in accordance with said code, an automatic distribution system is produced. Usually, a signal card bearing indicia in accordance with a preselected destination is attached to the exterior of the article. Contacting fingers or proximity detectors are spaced at predetermined intervals along the main conveyor to electronically read each signal card as it passes. Each read station in turn controls the operation of a diverting gate positioned down conveyor from the read station.

It is extremely important for the proper operation of this system that precautions be taken to insure that each article is guided as close as possible to the read station. To this end, guide bars have been mounted periodically along the main conveyor across from each read station. It is obvious that guides cannot be installed where they would interfere with the re-routing of articles onto the side conveyors. Hence, this method of construction severely limits the number of side conveyors which can be accommodated per unit length of the main conveyor. Therefore, it is a great disadvantage to utilize such space-consuming construction in warehouses and factories where space is already at a premium.

In order to overcome the limitations imposed by prior art design, the present invention teaches the use of an arcuate diverter bar movable from a first to a second position to perform a two-fold function. In the first position, the bar serves as a guide by channeling articles between its outer curved surface and the read station. But, upon direction from an anteriorly mounted read station, the bar is adapted to swing out to the second position, whereby the inner curved surface of the diverter bar communicates with the approaching article to direct the same down a side conveyor.

Accordingly, it is a primary object of the present invention to provide a branched conveyor system having a novel diverter means for facilitating the distribution of a flow of articles to a plurality of destinations.

It is another object of the present invention to provide a branch conveyor system having an automatic diverter which occupies a minimum of space.

It is a further object of the present invention to provide a branch conveyor system having a diverter mechanism which is rapid and efficient in operation.

It is a still further object of the present invention to provide a branch conveyor system having a diverter mechanism which is constructed with a minimum of moving parts subject to wear.

It is an additional object of the present invention to provide a branch conveyor system having a diverter assembly which may be readily installed on existing commercial conveyor lines.

It is yet another object of the present invention to provide a branch conveyor system having a diverter assembly which may be quite simply constructed at moderate cost and which may be economically maintained in satisfactory operating condition.

In addition to these objects the subject invention affords numerous other advantages as well as several admirable features which will be revealed in the subsequent specification when it is examined along with the appended drawings, in which.

Figure 1:
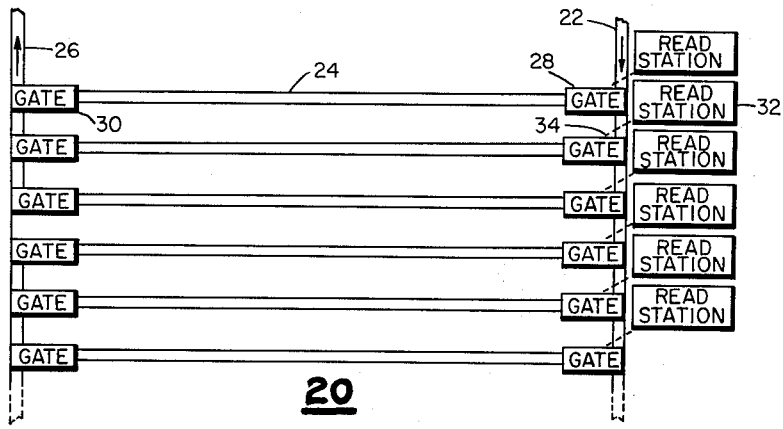
Fig. 1 is a flow diagram of a portion of a branched conveyor system in accordance with one application of the present invention to an article distribution system.

With reference to Fig. 1, the present invention is described in connection with a conveyor network adapted to route a number of articles into an area 20 of temporary storage. A feed conveyor 22 carries articles in the direction indicated by the arrow. In the storage area 20, a plurality of side conveyors as at 24 are mounted perpendicular to the feed conveyor 22 in close order. At the intersection of each side conveyor 24 and the feed conveyor 22 there is provided a gate 28 for diverting articles from the feed conveyor 22. Articles diverted onto a side conveyor remain there until they are required. At which time they are discharged onto a return conveyor 26 by means of a gate 30.

Inasmuch as the contents of conveyor 22 may consist of different articles, it may be desirable to divert similar articles onto a common side conveyor. If the articles approaching the storage area 20 are thus classified, their removal therefrom at a later time is facilitated. To accomplish this separation automatically, there are provided read stations as at 32 each of which is adapted to control a single gate 28. Dotted lines as at 34 represent the cooperation between each gate and its associated read station. It will be noted that each read station is located prior to its associated gate.

In order to identify incoming articles, coded signal cards may be fixed thereto. The signal cards bear indicia indicative of a predetermined destination in the storage area 20. Read stations 32 are adapted to successively detect the signal cards as they pass along the feed conveyor 22. However, a given read station is responsive only to one particular combination of indicia. When a signal card having such a combination is detected by said read station, a control operation is exerted upon the gate associated therewith. As a result, the gate 28 is actuated to direct the article down the side conveyor 28. Accordingly, every article bearing a similarly-coded signal card will be routed onto the same side conveyor. The sorting system briefly set forth hereinabove is described at length in a co-pending application for U.S. Letters Patent Serial No. 764,579, filed October 1, 1958, by William R. Clore.

It is necessary for the successful operation of the system that each article pass close to the read station 32 to allow the signal card to be inspected. Heretofore, guide means have been rigidly mounted on the opposite side of said conveyor from the read station to channel said articles into communication therewith. However, it is obviously impracticable to utilize such an expedient where space is limited. The mounting of guide means for said articles so as not to block the side conveyors 24 becomes a serious problem. Such is the case, in the instance cited, where the side conveyors 24 are quite closely mounted to afford maximum utilization of the space available for storage purposes.

To solve this dilemma, the present invention teaches a diverter gate 28 which is adapted to perform an alternate function of a guide. In this manner, a gate 28 may be mounted directly opposite a read station 32 at each junction of the feed conveyor 22 and the intersecting side conveyors 24. By eliminating the need for guide bars along the inside of feed conveyor 22 between side conveyors 24, the present invention permits the installation of more side conveyors per unit length of the feed conveyor, the number of said side conveyors being determined almost entirely by the lateral dimensions of each.

Figure 2:
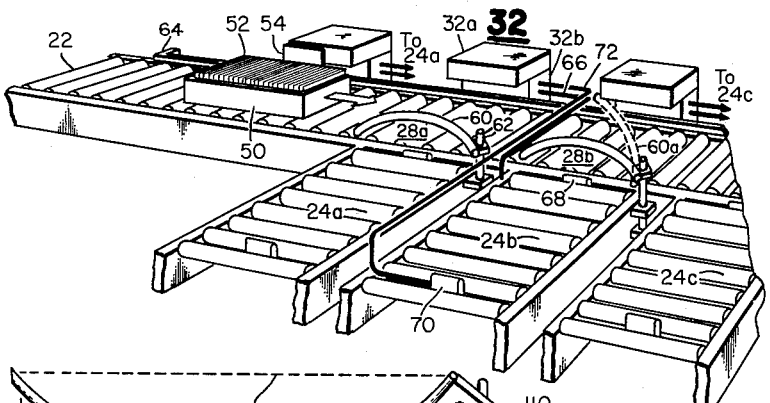
Fig. 2 is a perspective view showing a portion of the system of Fig. 1 in detail.

A graphic illustration of the novel gate apparatus 28 is presented in Fig. 2. Referring to Fig. 2, a tray 50 carrying articles 52 to be stored and a signal card 54 is shown travelling on the roller feed conveyor 22 in the direction indicated by the large arrow. It is seen that the signal card 54 is placed on the far side of the tray 50 so as to face toward the outside of conveyor 22. Signal card 54 may be releasably secured in a slot or rack provided on the tray 50.

The read station 32 is mounted on the outside of the feed conveyor 22 substantially in line with a first side conveyor 24a. Read station 32 is fabricated with a sensing unit 32a and a control unit 32b. The sensing unit faces toward the center of the conveyor 22 and is positioned at an elevation thereabove to be in horizontal alignment with the signal card 54.

The control unit 32b is responsive to the output signal of the sensing unit 32a to automatically control a similar diverter gate 28b located at the second side conveyor 24b. An electrical cable 66 connects the control unit 32b to suitable gate drive means located beneath the side conveyor 24b and hereinafter explained in detail.

The novel diverting gate 28a comprises a curved tubular bar 60 secured at one end to an axle 62 rotatively mounted on the side of conveyor 24a. The diverter bar 60 normally blocks the entrance to side conveyor 24a and is positioned above the conveyor level so that its convex surface is directed toward the center of the feed conveyor 22.

In the position shown, the diverter bar 60 projects slightly over the feed conveyor 22 to engage the side of an approaching tray 50. As the tray 50 passes the read station 32, it is seen that the diverter bar 60 forces the tray into light frictional engagement with the read station. Thus, the signal card 54 is guided close to the sensing unit 32a. It may be desirable to provide a stationary guide rail 64 along the outside of the feed conveyor 22 to prevent damage to the read stations 32 by passing trays 50.

As a typical example, tray 50 may be utilized to carry a quantity of second-class mail. It is not uncommon for mail processing centers to be deluged with large quantities of mail at various times during a given workday. Since it is impossible to cope with all the mail during times of increased workload, preference is usually shown for first-class mail by processing the same while dispatching circulars and lower rate mail to the storage area 20 for processing at a later time. For purposes of apt illustration, it may be assumed that mail in tray 50 is destined for a second conveyor 24b. Accordingly, the signal card 54 is appropriately coded in correspondence with said destination.

In response to the indicia contained in the signal card 54, the control unit 32b actuates the gate 28b. The diverter bar 60 extends across the feed conveyor 22 and assumes the dotted-line position 60a. The approaching tray 50 engages the concave surface of the diverter bar and is deflected toward the side conveyor 24b.

Generally, it is appropriate that the drive mechanism for side conveyor 24b be normally idle, and that the same should advance only when a tray 50 is delivered thereon. Accordingly, a pair of limit switches 68 and 70 are provided to start and stop the operation of the side conveyor 24b. Hence, when the gate 28b diverts a tray, the same will strike limit switch 68 which starts the side conveyor 24b. Thereupon, the tray is carried until it actuates limit switch 70 which stops the operation of side conveyor 24b. Switch 70 may also be utilized to actuate the release mechanism for gate 28b which is maintained in a diverting position by holding circuits housed in the control unit 32b. To this end, these circuits are connected to the limit switch 70 by a cable 72. The co-operation between read station 32 and gate 28b is typical for every side conveyor in the storage area; therefore, further explanation of operation is considered unnecessary.

Figure 3:
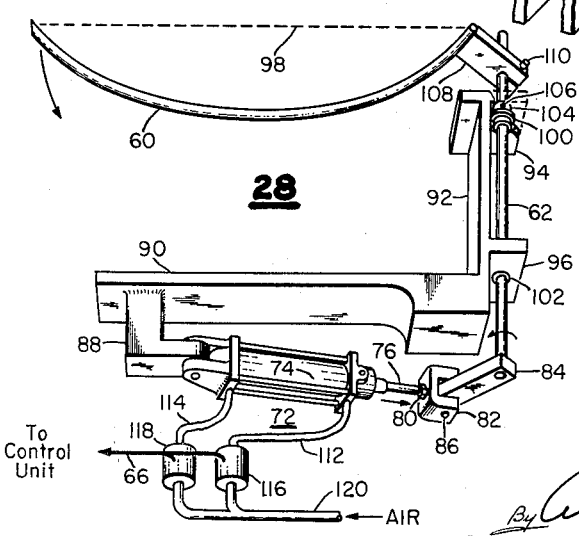
Fig. 3 is a detailed perspective view of the novel article diverting means utilized in the system of Fig. 1.

A preferred construction for the gate 28 is shown in detail in Fig. 3. In Fig. 3, a pneumatic driving device 72 includes a cylinder 74 and an air-actuated piston rod 76. The piston rod 76 projects slightly from one end of the cylinder 74 and is connected by a jam nut 80 to a clevis 82. A crank arm 84 is welded to the lower end of the axle 62 so that said arm is perpendicular to the longitudinal axis thereof. The end of the crank arm 84 is placed in the clevis 82 and a pin 86 is inserted to pivotally connect the two pieces.

The drive cylinder 74 is pivotally supported at its alternate end by an L-shaped mounting bracket 88. The cylinder mounting bracket 88 is welded or otherwise rigidly fastened to a base plate 90 to extend downwardly therefrom. One side of the base plate 90 is formed with an upwardly extending diverter mounting bracket 92. The diverter mounting bracket 92 is fabricated with a pair of outwardly extending pieces 94 and 96 adapted to rotatively support the driving axle 62. Vertically aligned holes are drilled in the pieces 94 and 96 and bronze bearings 100 and 102 are inserted therein to engage the drive axle 62; upper bearing 100 may be preferably of the flange type. To prevent axle 62 from slipping out, a collar 104 is secured thereabout by a set-screw 106. Collar 104 will then ride the flange bearing 100 during rotation of the drive axle 62.

The diverter bar 60 is preferably constructed of steel tubing bent into a gently curving circular arc subtending a chord 98. One end of the diverter bar 60 is secured to a clamp 108 and the entire assembly is releasably secured to the upper portion of the drive axle 62 by means of a set-screw 110. Thus, the relative position of the diverter bar 60 on axle 62 may be adjusted by simply loosening the set-screw 110 and sliding or rotating the entire diverter bar and clamp. It should be understood that the physical configuration of the diverter bar 60 may take any form to accomplish the purpose intended.

To power the gate 28, a pair of flexible pressure hoses 112 and 114 respectively connect the end ports of the air cylinder 74 to a pair of solenoid actuated valves 116 and 118. Valves 116 and 118 are further connected to an air pressure supply line 120. Each valve is provided with an exhaust port vented to the atmosphere. It will be appreciated that the other actuating expedients may be utilized; therefore, the example described should not be considered restrictive of the subject invention.

The gate assembly 28 is secured to the side conveyor by bolting the base plate 90 to the underside thereof as close as physically possible to feed conveyor 22. The diverter bar mounting bracket 92 may then be fastened to the edge of the side conveyor 24. Normally, air is admitted to the cylinder 74 through valve 116 to maintain the piston rod 76 in the retracted position shown. In which case, clamp 108 should be rotated about the axle 62 until the chord 98 subtended by the curved diverter bar 60 is arranged substantially parallel to the feed conveyor 22.

In order to actuate the gate 28, the control unit of the read station 32 must energize the valve 118 and de-energize valve 116 over line 66. Valve 118 opens to admit air pressure to hose 114. Whereupon, linear motion is imparted to the piston rod 76. Due to the eccentric linkage, this motion is converted to rotary movement of the drive axle 62 in the direction illustrated by the curved arrow. The diverter bar 60 swings over the feed conveyor 22 and the chord 98 is angularly displaced with regard to the center line of the feed conveyor 22. The approaching tray 50 engages the concave surface of the diverter bar 60 and is deflected toward the side conveyor.

When the tray 50 engages switch 68, the side conveyor is driven to propel the tray into the storage area 20. As soon as the tray 50 strikes the limit switch 70, the control unit of the read station 32 energizes valve 116 and de-energizes valve 118 to open the gate 28 and allow subsequent trays to continue down the feed conveyor. For a more detailed description of the control circuits, reference may be had to the hereinabove cited co-pending application.

It should be realized that numerous additions, substitutions and omissions may be made in the preferred embodiment of the present invention without detracting from the spirit and scope thereof, and further, that said embodiment was chosen merely as an example to illustrate the utilitarian aspects of said invention. Accordingly, the only limitations are those set forth in the appended claims.

What is claimed is:

1. An article distribution system comprising a main conveyor bearing a series of articles to be distributed, a plurality of branch conveyors spaced along the inside of said main conveyor and intersecting the same, said articles bearing destination-indicative indicia, a plurality of read stations individually responsive to a certain combination of said indicia to generate an electrical signal, means for mounting said read stations along the outside of said main conveyor at each of said intersections, and a plurality of diverting gates each comprising an arcuate bar having an outer convex surface and a corresponding inner concave surface, means for rotatively mounting one end of said bar at said intersection opposite said read station, means for positioning said bar in a first position in spaced relation to said read station, means for positioning said bar in a second position blocking the path of said articles, and means energized by said electrical signal for actuating said diverter gate to said second position.

2. An article distribution system comprising a main conveyor bearing a series of articles to be distributed, a plurality of branch conveyors spaced along the inside of said main conveyor and intersecting the same, said articles bearing destination-indicative indicia, a plurality of read stations individually responsive to a certain combination of said indicia to generate an electrical signal, means for mounting said read stations along the outside of said main conveyor at each of said intersections, and a plurality of diverting gates each comprising an arcuate bar having an outer convex surface and a corresponding inner concave surface, said bar describing a chord, an axle rotatably mounted at said intersection directly opposite said read station, said axle being perpendicular to said conveyors, means for connecting one end of said bar to said axle, reversible drive means, means for connecting said reversible drive means to said axle to rotate said chord to a first position substantially parallel to said main conveyor, said outer surface of said bar defining with said read station a path for said articles in said first position, circuit means responsive to said electrical signal for energizing said drive means, means for connecting said circuit means to said drive means to rotate said chord to a second position across said main conveyor, said inner surface of said bar adapted to communicate with said articles in said second position to describe an alternate path therefor, switch means responsive to said articles for reversing said drive means, means for mounting said switch means on said branch conveyor in communication with articles diverted thereon, and means for connecting said switch means to said drive means to return said bar to said first position.

3. A system substantially as set forth in claim 2 in which said reversible drive means comprises a cylinder and air-actuated piston, a crank arm, means for connecting one end of said crank arm to said axle, means for pivotally connecting the other end of said crank arm to said piston, a supply of air, and means for connecting said air supply to said cylinder.

References Cited in the file of this patent

UNITED STATES PATENTS

| | | |
|---|---|---|
| 1,654,688 | Knap | Jan. 3, 1928 |
| 2,253,572 | Mitchell | Aug. 26, 1941 |
| 2,728,466 | Postlewaite | Dec. 27, 1955 |
| 2,803,333 | Freeman | Aug. 20, 1957 |